United States Patent
Sugimoto et al.

(10) Patent No.: US 8,218,812 B2
(45) Date of Patent: Jul. 10, 2012

(54) DIGITAL WATERMARK EMBEDDING DEVICE AND METHOD, AND DIGITAL WATERMARK DETECTION DEVICE AND METHOD

(75) Inventors: Kazuo Sugimoto, Tokyo (JP); Ryousuke Fujii, Tokyo (JP); Hiroshi Ito, Tokyo (JP); Mitsuyoshi Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 442 days.

(21) Appl. No.: 12/602,140

(22) PCT Filed: May 28, 2007

(86) PCT No.: PCT/JP2007/060794
§ 371 (c)(1),
(2), (4) Date: Nov. 27, 2009

(87) PCT Pub. No.: WO2008/146353
PCT Pub. Date: Dec. 4, 2008

(65) Prior Publication Data
US 2010/0172539 A1    Jul. 8, 2010

(51) Int. Cl.
*G06K 9/00* (2006.01)
(52) U.S. Cl. ....................................... 382/100
(58) Field of Classification Search .................. 382/100
See application file for complete search history.

(56) References Cited

U.S. PATENT DOCUMENTS

| | | | |
|---|---|---|---|
| 7,127,065 B1* | 10/2006 | Depovere et al. | 380/201 |
| 7,130,443 B1* | 10/2006 | Werner et al. | 382/100 |
| 7,392,394 B2* | 6/2008 | Levy | 713/176 |
| 7,412,072 B2* | 8/2008 | Sharma et al. | 382/100 |
| 7,970,164 B2* | 6/2011 | Nakamura et al. | 382/100 |

FOREIGN PATENT DOCUMENTS

| | | |
|---|---|---|
| CN | 1218278 C | 9/2005 |
| JP | 2005-513835 | 12/2005 |
| JP | 2006-80722 A | 3/2006 |
| WO | WO 2007/003008 A1 | 1/2007 |
| WO | WO 2007/015452 A1 | 8/2007 |

OTHER PUBLICATIONS

Haruyuki Nakamura et al., "CRT Saisatsu Eizo ni Taisei o Yasuru Denshi Sukashi no Umekomi ni Kansuru Kento", The Transactions of the Institute of Electronics, Information and Communication Engineers IE2005-311 vol. 105, No. 611 pp. 137 to 142 Feb. 14, 2006.

* cited by examiner

*Primary Examiner* — Tom Y Lu
(74) *Attorney, Agent, or Firm* — Birch, Stewart, Kolasch & Birch, LLP (57) ABSTRACT

A digital watermark embedding device according to the present invention includes: a watermark pattern generation part (4) which generates a watermark pattern varying in a time direction based on embedding information to be embedded in an input image to be processed; a synchronization pattern generation part (3) which outputs a fixed pattern for detecting synchronization as a watermark pattern; a pattern switching part (5) which selects between the watermark pattern output by the synchronization pattern generation part (3) and the watermark pattern output by the watermark pattern generation part (4) based on the input image (7a); and an embedding processing part (6) which adds the selected watermark pattern to each pixel value of the input image (7a) to generate an embedded image (7c) having a digital watermark embedded therein. Consequently, phase shifting may be detected based on the fixed pattern for detecting synchronization, there by being capable of precisely detecting the digital watermark out of a recaptured image as well.

10 Claims, 6 Drawing Sheets

FIG. 2

INPUT IMAGE

FIG. 4

DIGITAL WATERMARK EMBEDDING DEVICE AND METHOD, AND DIGITAL WATERMARK DETECTION DEVICE AND METHOD

TECHNICAL FIELD

The present invention relates to a digital watermark embedding device and method, and a digital watermark detection device and method, and more particularly, to a digital watermark embedding device and method, and a digital watermark detection device and method, which allow detection of a digital watermark out of a recaptured image as well, the recaptured image being obtained by taking again (recapturing), with a camera, an image projected on a screen in a movie theater or on a television screen.

BACKGROUND ART

In recent years, along with the proliferation of a low-priced high-performance video camera, there has been occurred such a case where a video image shown in a movie theater or the like is directly taken with a video camera in secret and copied on a DVD or the like, and the DVD having such an image copied thereon is illegally sold, and it has been an issue to ensure protection of copyright of a video image. As a method for dealing with such an issue, there has been proposed a digital watermark technology for a moving image signal (see, for example, Patent Document 1).

According to the conventional technology disclosed in Patent Document 1, a luminance variation pattern is embedded in a time direction and in a spatial direction as a digital watermark in a moving image to be protected by copyright. Further, a correlation value for a video signal of the video image to be subjected to detection, in relation to a detected pattern, is obtained, to thereby detect information embedded as the digital watermark. With the conventional technology, when copyright information is embedded as a digital watermark, it is possible to obtain the copyright information even from a recaptured image which is an illegal copy, and to claim the copyright thereto, which also serves as a deterrent against an illegal copy made by recapturing a video image.

Patent Document 1: JP 2006-517068 A (pp. 4 to 8 and FIG. 4)

DISCLOSURE OF THE INVENTION

Problem to be Solved by the Invention

However, according to the conventional digital watermark technology for a recaptured video image disclosed in Patent Document 1, it is not possible to identify a phase shifting between an embedded video image and a video image to be subjected to the detection, which leads to a problem that precise detection cannot be performed.

The present invention has been made to solve the above-mentioned problem, and it is an object of the invention to provide a digital watermark embedding device and method, and a digital watermark detection device and method, which allow highly-accurate detection of a digital watermark out of a recaptured image as well.

Means for Solving the Problem

The present invention provides a digital watermark embedding device including: a watermark pattern generation part which receives an input of embedding information to be embedded in an input image to be processed, and generates a watermark pattern varying in a time direction based on the embedding information; a synchronization pattern generation part which outputs, as a watermark pattern, a pre-set fixed pattern for detecting synchronization; a pattern switching part which selects, based on the input image, any one of the watermark pattern output by the synchronization pattern generation part and the watermark pattern output by the watermark pattern generation part; and an embedding processing part which adds, to each pixel value of the input image, the watermark pattern selected by the pattern switching part, to thereby generate an embedded image having a digital watermark embedded therein.

Effect of the Invention

The present invention provides the digital watermark embedding device including: the watermark pattern generation part which receives the input of the embedding information to be embedded in the input image to be processed, and generates the watermark pattern varying in the time direction based on the embedding information; the synchronization pattern generation part which outputs, as the watermark pattern, the pre-set fixed pattern for detecting synchronization; the pattern switching part which selects, based on the input image, any one of the watermark pattern output by the synchronization pattern generation part and the watermark pattern output by the watermark pattern generation part; and the embedding processing part which adds, to each pixel value of the input image, the watermark pattern selected by the pattern switching part, to thereby generate the embedded image having the digital watermark embedded therein. Consequently, phase shifting may be compensated based on the fixed pattern for detecting synchronization, thereby being capable of precisely detecting the digital watermark out of a recaptured image as well.

BEST MODES FOR CARRYING OUT THE INVENTION

First Embodiment

Figure 1:
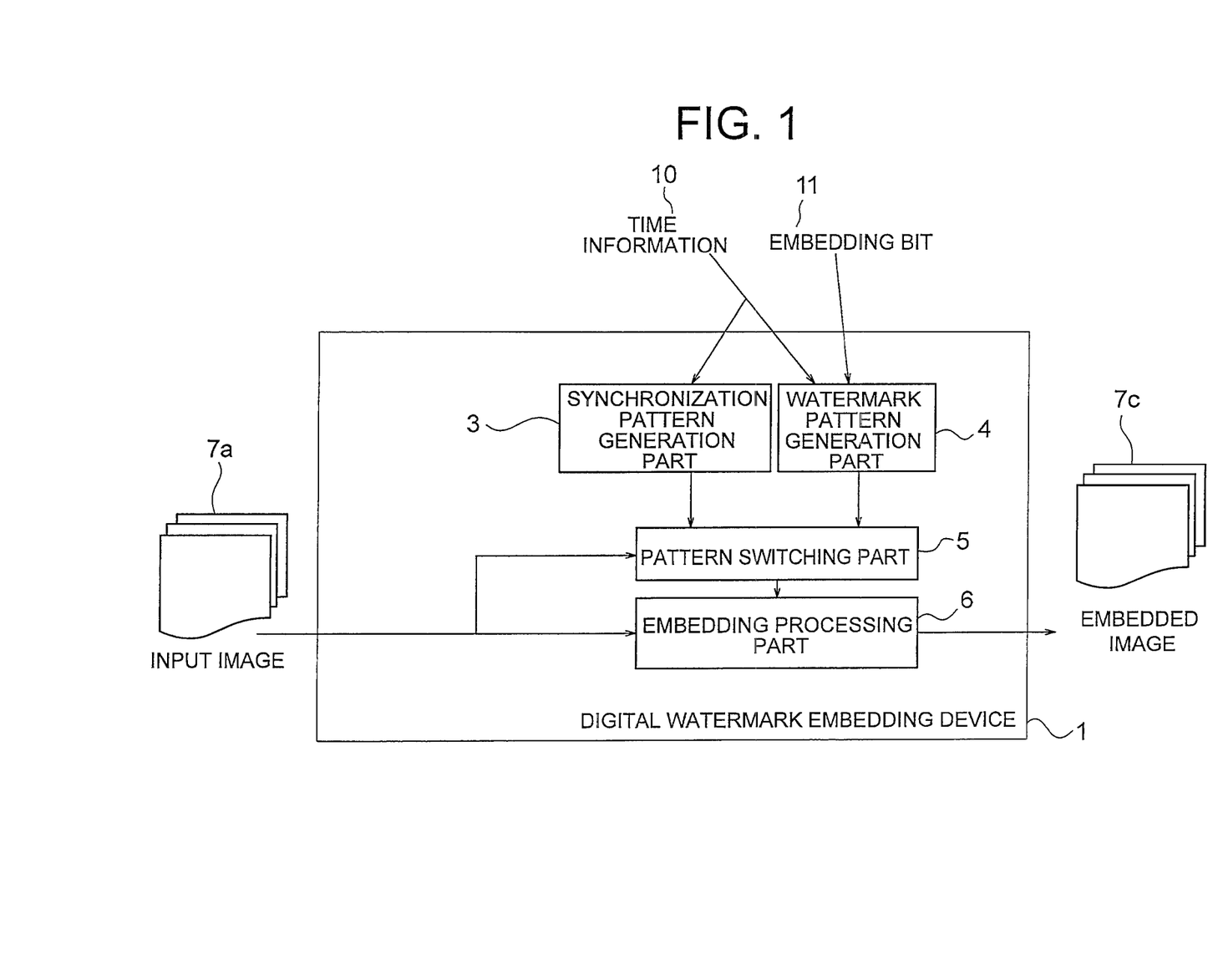
FIG. 1 is a block diagram illustrating a configuration of a digital watermark embedding device according to a first embodiment of the present invention.

FIG. 1 is a block diagram illustrating a configuration of a digital watermark embedding device according to a first embodiment of the present invention. The digital watermark embedding device 1 includes, as illustrated in FIG. 1, a synchronization pattern generation part 3 which outputs, as a watermark pattern, a pre-set fixed pattern for detecting synchronization, a watermark pattern generation part 4 which receives an input of embedding information to be embedded in an input image to be processed (hereinafter, referred to as input image 7a) and generates a watermark pattern varying in a time direction based on the embedding information, a pattern switching part 5 which selects between the watermark pattern output by the synchronization pattern generation part 3 and the watermark pattern output by the watermark pattern generation part 4, and an embedding processing part 6 which embeds a digital watermark in the input image 7a by adding the selected watermark pattern to each pixel value of the input image 7a, to thereby generate an embedded image 7c.

Note that the digital watermark embedding device 1 may be implemented by, for example, causing a computer such as a general-purpose computer to execute a digital watermark embedding program according to a digital watermark embedding method of the present invention. In other words, the digital watermark embedding program is executed by a computer to cause the computer to function as the above-mentioned constitutional elements 3 to 6, to thereby perform characteristic data processing by the digital watermark embedding device 1. Note that a configuration and a basic function of the computer itself for implementing the digital watermark embedding device 1 can be easily recognized by a person skilled in the art based on common knowledge in the technical field thereof, and do not directly affect the gist of the present invention. Therefore, a detailed description thereof is omitted in the following description.

Figure 3:
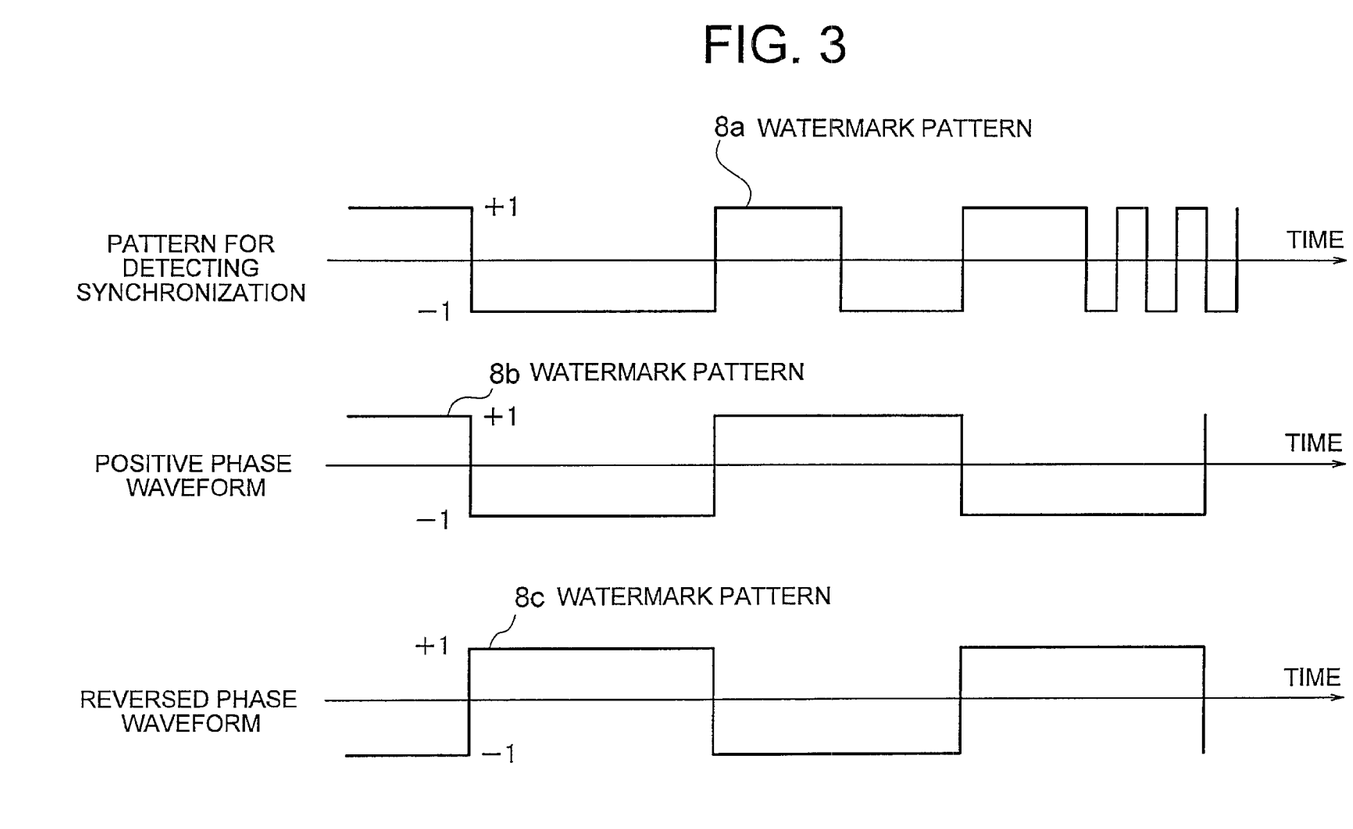
FIG. 3 is a waveform diagram illustrating examples of watermark patterns each output from a synchronization pattern generation part and a watermark pattern generation part of the digital watermark embedding device according to the first embodiment of the present invention.

The synchronization pattern generation part 3 receives an input of time information 10, and outputs, with reference to the time information 10, a pre-set fixed pattern for detecting synchronization (hereinafter, referred to as pattern for detecting synchronization detecting pattern), as a watermark pattern. For example, a synchronization detecting pattern as illustrated in FIG. 3 is output as a watermark pattern 8a.

Note that the time information 10 is used for determining, in the synchronization detecting pattern 8a which exhibits time variation, a time point at which a value of the synchronization detecting pattern 8a is output, as an output from the synchronization pattern generation part 3, to the pattern switching part 5. In other words, the synchronization pattern generation part 3 may output one of values of +1 and −1 in the synchronization detecting pattern 8a at a time point corresponding to the received time information 10.

Further, to obtain the time information 10, in a case where the input image 7a is a moving image formed of a plurality of frames, a leading frame of the input image 7a is set as a starting point and the respective frames are each allocated with a reproduction time with reference to the starting point.

On the other hand, the watermark pattern generation part 4 receives inputs of an embedding bit 11 as embedding information forming a digital watermark and the time information 10, generates a watermark pattern in accordance therewith, and outputs the watermark pattern. In other words, in a case of embedding "1" as the embedding bit 11, a watermark pattern 8b of positive phase sequence (positive phase waveform) illustrated in FIG. 3 is output. Alternatively, in a case of embedding "0" as the embedding bit 11, a reversed phase sequence (reversed phase waveform) illustrated in FIG. 3 is output as a watermark pattern 8c. Note that the watermark pattern is not limited to the watermark patterns 8a to 8c having the waveforms illustrated in FIG. 3, and may employ another waveform. Note that the embedding information (embedding bit 11) refers to information desired to be embedded into the input image 7a, which includes, for example, copyright information.

The watermark pattern 8a has a waveform in a waveform pattern which varies for each nonconstant variable time domain, as illustrated in FIG. 3. In an example of FIG. 3, "+1" and "−1" are reversed at long time intervals in a first time domain, while the time interval reduces in a middle time domain, and the time interval further reduces in a last time domain. In a time domain in which the time interval is shorter, recovery of synchronization is possible with high accuracy. On the other hand, even if the time interval is shorter, in a case where the synchronization pattern is formed only of one type of time intervals, it is not possible to identify a case where the pattern is shifted by the time interval (or by the integral multiple of the time interval). In view of this, the pattern is formed of a mixture of short time intervals and long time intervals as illustrated in FIG. 3, to thereby prevent misidentification of synchronization occurring in a time interval equal to or smaller in length than the time interval of the watermark pattern 8a. Further, in the watermark patterns 8b and 8c, +1 and −1 are reversed at the same time interval. Note that the watermark pattern 8b has an inverted waveform with respect to the waveform of the watermark pattern 8c, and in a time domain in which the waveform of the watermark pattern 8b has a value of +1, the waveform of the watermark pattern 8c has a value of −1.

Figure 2:
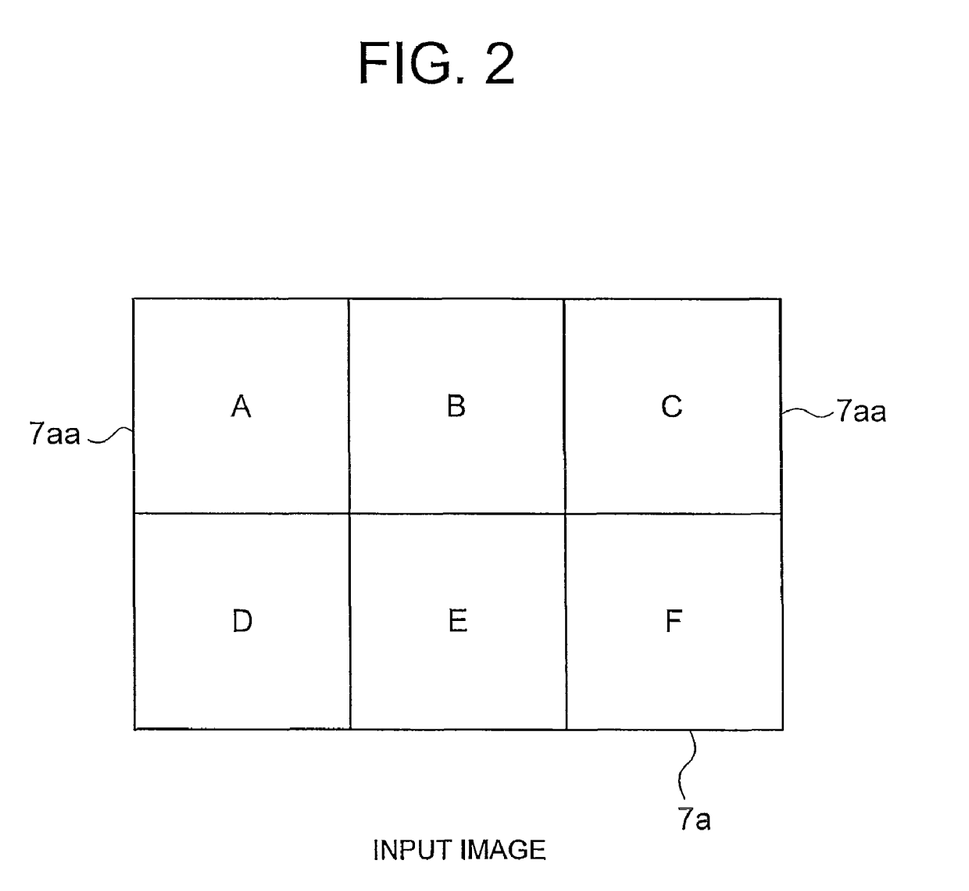
FIG. 2 is an explanatory diagram illustrating an example of an input image to be input to the digital watermark embedding device according to the first embodiment of the present invention.

The pattern switching part 5 performs control such that the watermark pattern 8a generated by the synchronization pattern generation part 3 is output with respect to an image region, of the input image 7a, the image region being set in advance as a synchronization pattern image region, while with respect to the rest of image regions, the watermark pattern 8b or the watermark 8c generated by the watermark pattern generation part 4 is output. Note that the synchronization pattern image region is described as follows. The input image 7a (in FIG. 1, the input image 7a is illustrated as a moving image formed of a plurality of frames) is spatially segmented into a plurality of regions, and some of the segmented regions are provided as the synchronization pattern image regions. In the following, as illustrated in FIG. 2, a description is given by taking, as an example, a case where each of the frames of the input image 7a is segmented into six segmented regions 7aa. Note that, in FIG. 2, the segmented regions 7aa are each denoted by reference symbols A, B, C, D, E, and F, respectively, for the purpose of identifying each of the segmented regions 7aa thus segmented. Of course, the number of the input image 7a and the number of the segmented regions 7aa are not necessarily limited to the values described above, and may be implemented as an arbitrary combination thereof. Further, the pattern switching part 5 may switch between the watermark pattern output by the synchronization pattern generation part 3 and the watermark pattern output by the watermark pattern generation part 4, not only depending on the type of each of the image regions 7aa generated as described above (depending on whether or not the region is a synchronization pattern image region), but on a frame-by-frame basis of the input image 7a. Alternatively, the switching on a frame-by-frame basis and the switching depending on the type of the image region may be employed in combination.

With respect to each pixel of the input image 7a, the embedding processing part 6 adds the watermark pattern output by the pattern switching part 5, performs clipping processing at a maximum value and a minimum value of the pixel value, and outputs the resultant image as an embedded image 7c.

Figure 4:
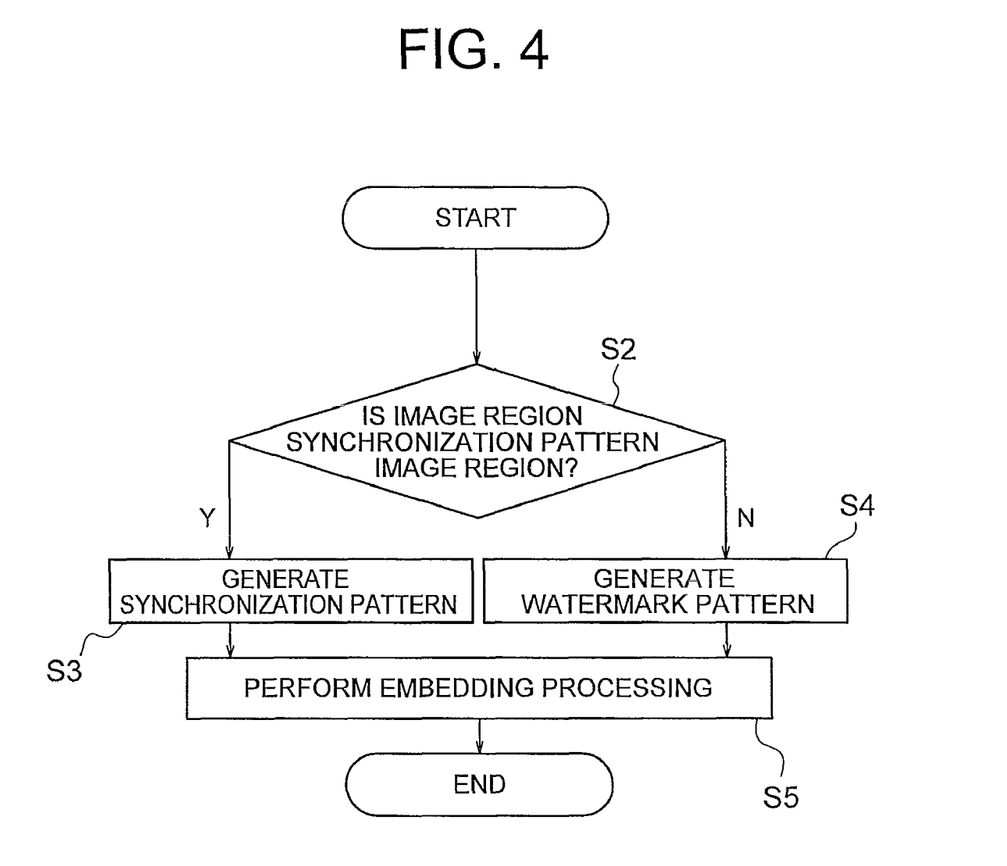
FIG. 4 is a flow chart illustrating a flow of processing of a digital watermark embedding method according to the first embodiment of the present invention.

Next, a description is given of an operation of the digital watermark embedding device according to the first embodiment of the present invention. FIG. 4 is a flow chart illustrating an operation of the digital watermark embedding device 1 according to the first embodiment of the present invention.

As illustrated in FIG. 4, the digital watermark embedding device 1 receives an input of the input image 7a to be embedded with a digital watermark. The pattern switching part 5 judges the input image 7a as to whether or not the image region to be processed is a synchronization pattern image region (Step S2).

In a case where the image region to be processed is a synchronization pattern image region, the pattern switching part 5 performs control such that the synchronization pattern generation part 3 outputs, with reference to the time information 10, a predetermined fixed pattern for detecting synchronization, as the watermark pattern 8a (Step S3).

On the other hand, in a case where the image region to be processed is not a synchronization pattern image region, the pattern switching part 5 performs control such that the watermark pattern generation part 4 outputs, with reference to the embedding bit 11 and the time information 10, the watermark pattern 8b or the watermark pattern 8c (Step S4).

The watermark pattern (any one of the watermark pattern 8a, the watermark pattern 8b, and the watermark pattern 8c) output by any one of the synchronization pattern generation part 3 and the watermark pattern generation part 4 is input through the pattern switching part 5 to the embedding processing part 6. Note that, in this case, the pattern switching part 5 switches between the watermark pattern output by the synchronization pattern generation part 3 and the watermark pattern output by the watermark pattern generation part 4, depending on the type of each of the image regions 7aa (depending on whether or not the region is a synchronization pattern image region).

The embedding processing part 6 receives, together with an input of the watermark pattern described above, an input of the input image 7a. Upon receiving the inputs, the embedding processing part 6 adds the watermark pattern output by the pattern switching part 5 and performs clipping processing at a maximum value and a minimum value of the pixel value, with respect to each pixel of the input image 7a. Then, the embedding processing part 6 outputs the resultant image as the embedded image 7c (Step S5). As a result, the input image 7a to be processed is embedded with a fixed pattern for detecting synchronization in each of the predetermined synchronization pattern image regions thereof while being embedded with a watermark pattern corresponding to embedding information desired to be embedded, such as copyright information, in each of the image regions other than the predetermined synchronization pattern image regions.

As described above, in the digital watermark embedding device 1 according to the first embodiment, a fixed pattern for detecting synchronization is embedded in a predetermined image region, while a watermark pattern corresponding to embedding information indicating copyright information or the like is embedded in a region other than the predetermined image region, to thereby generate a digital watermark embedded image suited for detection of time synchronization. Accordingly, it is possible to automatically detect and compensate for a phase shifting between the embedded image 7c and a recaptured image obtained by retaking the embedded image 7c, based on the fixed pattern for detecting synchronization, which allows a digital watermark to be detected with accuracy out of the recaptured image, with the result that embedding information such as copyright information embedded in the embedded image 7c can be reliably taken out.

Second Embodiment

Figure 5:
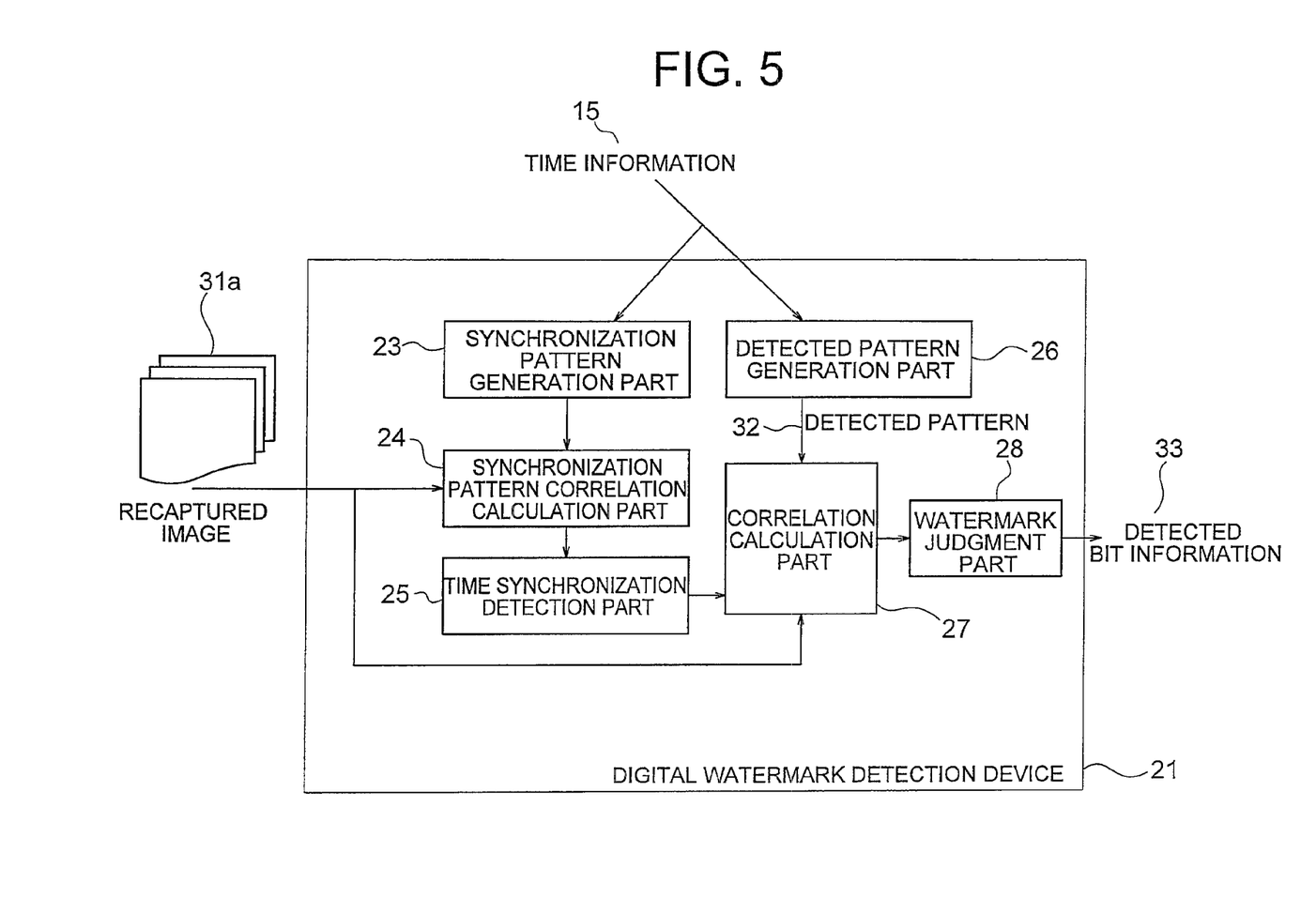
FIG. 5 is a block diagram illustrating a configuration of a digital watermark detection device according to a second embodiment of the present invention.

FIG. 5 is a block diagram illustrating a configuration of a digital watermark detection device 21 according to a second embodiment of the present invention. The digital watermark detection device 21 is a device for detecting a digital watermark out of a recaptured image 31a. The recaptured image 31a is obtained by retaking, by an image-taking device such as a video camera, the embedded image 7c which is reproduced and displayed by a display device after being output by the digital watermark embedding device 1 according to the first embodiment.

The digital watermark detection device 21 includes a synchronization pattern generation part 23 which outputs, with reference to time information 15, a fixed pattern for detecting synchronization, the fixed pattern being similar to the fixed pattern for detecting synchronization generated by the synchronization pattern generation part 3 according to the first embodiment, a detected pattern generation part 26 which generates, with reference to the time information 15, a detected pattern 32, the detected pattern 32 being similar to the watermark pattern 32 generated by the watermark pattern generation part 4 according to the first embodiment, a synchronization pattern correlation calculation part 24 which obtains correlation values between the respective pixels of the recaptured image 31a subjected to detection and the fixed pattern for detecting synchronization by shifting the phase therebetween, and outputs the correlation value for each phase as a synchronization pattern correlation value, a time synchronization detection part 25 which outputs, of the respective phases, a phase in which the number of pixels each having the synchronization pattern correlation value larger than a pre-set predetermined correlation threshold value is maximum, as a time synchronized phase, a correlation calculation part 27 which calculates a correlation value between the pixel value in the recaptured image 31a and a pattern obtained by shifting the detected pattern 32 by the time synchronized phase and outputs the correlation value as a detected correlation value, and a watermark judgment part 28 which determines a value of the embedding bit by comparing the detected correlation value and a pre-set threshold value and outputs the value of the embedding bit as detected bit information 33.

Note that the digital watermark detection device 21 may be implemented by, for example, causing a computer such as a general-purpose computer to execute a digital watermark detection program according to the present invention. In other words, the digital watermark detection program is executed by a computer to cause the computer to function as the above-mentioned constitutional elements 23 to 28, to thereby perform characteristic data processing by the digital watermark detection device 21. Note that a configuration and a basic function of the computer itself for implementing the digital watermark detection device 21 can be easily recognized by a person skilled in the art based on common knowledge in the technical field thereof, and do not directly affect the gist of the present invention. Therefore, a detailed description thereof is omitted in the following description.

The synchronization pattern generation part 23 receives an input of the time information 15, and outputs a value, that is, one of +1 and −1, at a time point corresponding to the time information 15 in a pattern similar to the synchronization detecting pattern 8a which is the fixed pattern for detecting synchronization according to the first embodiment. As described later along with a description to be given of the synchronization pattern correlation calculation part 24, the output from the synchronization pattern generation part 23 is embedded with a digital watermark according to an exemplary method as described in the first embodiment, reproduced and displayed, and retaken with an image-taking device such as a video camera, based on which a correlation is calculated with respect to the synchronization detection pattern 8*a* remaining in the recaptured image 31*a* input to the detection device 21 according to the second embodiment. Accordingly, a correlation value is calculated between patterns which are originally the same pattern, and therefore the correlation value exhibits a strong correlation therebetween, with the result that the embedded synchronization detection pattern 8*a* is detected.

The synchronization pattern correlation calculation part 24 calculates a correlation value between each of the pixels of the recaptured image 31*a* and the synchronization pattern by shifting the phase for each frame, and outputs the correlation value as the synchronization pattern correlation value for each phase.

The time synchronization detection part 25 compares the synchronization pattern correlation value of each phase with a pre-set predetermined correlation threshold value, and outputs, of the respective phases, a phase in which the number of pixels (pixel count) each having the synchronization pattern correlation value larger than the correlation threshold value is maximum, as a time synchronized phase.

The detected pattern generation part 26 receives an input of the time information 15, generates, with reference to the time information 15, the detected pattern 32, and outputs the detected pattern 32 to the correlation calculation part 27. The detected pattern 32 is, for example, of positive phase sequence illustrated in FIG. 3.

The correlation calculation part 27 adds up the correlation values between the respective pixel values of the recaptured image 31*a* and a pattern obtained by shifting the detected pattern 32 by a time synchronized phase (corresponding to the phase shifting), and outputs the resultant value as an integrated correlation value.

The watermark judgment part 28 compares the integrated correlation value with a pre-set threshold value. In a case where the integrated correlation value is larger than the threshold value, the watermark judgment part 28 determines that a value of the embedding information (embedding bit) embedded in an original embedded image recaptured is "1", while in a case where the integrated correlation value is equal to or smaller than the threshold value, the watermark judgment part 28 determines that a value of the embedding information (embedding bit) is "0", and the determined value is output as detected bit information 33.

Figure 6:
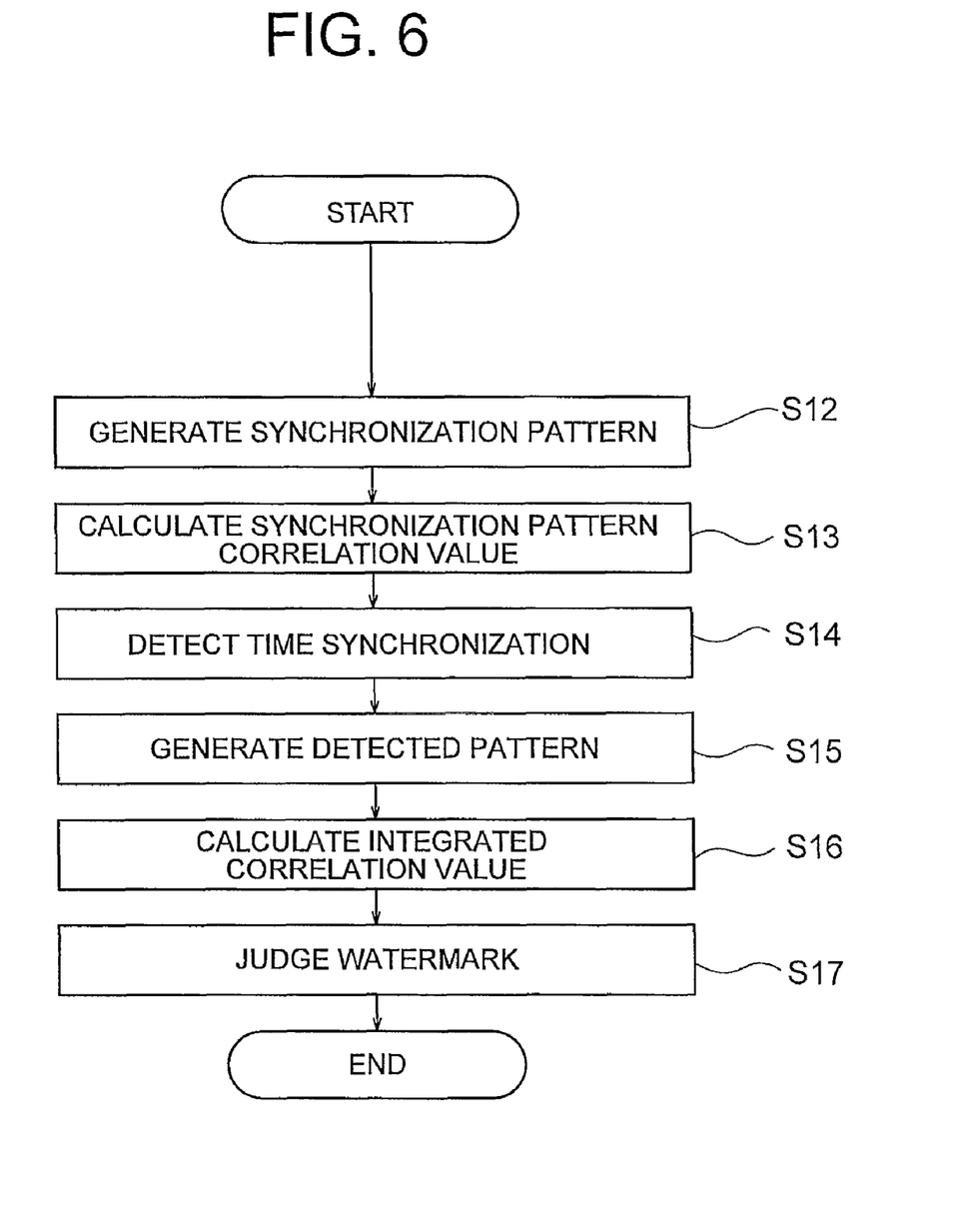
FIG. 6 is a flow chart illustrating a flow of processing of a digital watermark detection method according to the second embodiment of the present invention.

Next, a description is given of an operation of the digital watermark detection device 21. FIG. 6 is a flow chart illustrating the operation of the digital watermark detection device 21 according to the second embodiment of the present invention.

As illustrated in FIG. 6, when the time information 15 is input to the synchronization pattern generation part 23, a synchronization pattern similar to the fixed pattern for detecting synchronization according to the first embodiment of the present invention is output with reference to the time information 15 (Step S12).

Next, the recaptured image 31*a* and the synchronization pattern are input to the synchronization pattern correlation calculation part 24. The synchronization pattern correlation calculation part 24 calculates a correlation between each of the pixels of the recaptured image 31*a* and the synchronization pattern by shifting the phase for each frame, the correlation being calculated on phase-by-phase basis, and outputs the correlation as the synchronization pattern correlation value for each phase (Step S13).

Next, the synchronization pattern correlation value for each of the phases is input to the time synchronization detection part 25, and, of the phases, a phase in which the number of pixels each having the synchronization pattern correlation value larger than a predetermined correlation threshold value is maximum, is output as the time synchronized phase (Step S14).

Further, when the time information 15 is input to the detected pattern generation part 26, the detected pattern 32 is generated with reference to the time information 15 and output (Step S15).

When the recaptured image 31*a*, the detected pattern 32, and the time synchronized phase are input to the correlation calculation part 27, a correlation value between the recaptured image 31*a* and a pattern obtained by shifting the detected pattern 32 by the time synchronized phase is added up for a predetermined time period to be output as the integrated correlation value (Step S16).

The integrated correlation value is input to the watermark judgment part 28, and compared with a pre-set threshold value. When the integrated correlation value is larger than the pre-set threshold value, it is determined that bit information of the detected embedding bit is "1", while when the integrated correlation value is equal to or smaller than the pre-set threshold value, it is determined that bit information of the detected embedding bit is "0", and the bit information is output as the detected bit information 33 (Step S17).

As described above, according to the digital watermark detection device 21 of the second embodiment, the fixed pattern for detecting synchronization is detected, to thereby detect the time synchronized phase (phase shifting), which makes it possible to make the phase of the recaptured image 31*a* to be subjected to detection and the phase of the detected pattern accurately coincide with each other. As a result, there is obtained an effect of attaining precise detection of a digital watermark. Accordingly, it is possible to automatically detect and compensate for a phase shifting between the embedded image 7*c* and a recaptured image obtained by retaking the embedded image 7*c*, based on the fixed pattern for detecting synchronization, which allows a digital watermark to be detected with accuracy out of the recaptured image, with the result that embedding information such as copyright information embedded in the embedded image 7*c* can be reliably taken out.

The invention claimed is:

1. A digital watermark embedding device, comprising:
   a watermark pattern generation part which receives an input of embedding information to be embedded in an input image to be processed, and generates a watermark pattern varying in a time direction based on the embedding information;
   a synchronization pattern generation part which outputs, as a watermark pattern, a pre-set fixed pattern for detecting synchronization;
   a pattern switching part which selects, based on the input image, any one of the watermark pattern output by the synchronization pattern generation part and the watermark pattern output by the watermark pattern generation part; and
   an embedding processing part which adds, to each pixel value of the input image, the watermark pattern selected by the pattern switching part, to thereby generate an embedded image having a digital watermark embedded therein.

2. A digital watermark embedding device according to claim 1, wherein
the pattern switching part switches, based on a type of an image region of the input image, between the watermark pattern output by the synchronization pattern generation part and the watermark pattern output by the watermark pattern generation part.

3. A digital watermark embedding device according to claim 1, wherein
the pattern switching part switches, for each image input as the input image, between the watermark pattern output by the synchronization pattern generation part and the watermark pattern output by the watermark pattern generation part.

4. A digital watermark embedding device according to claim 1, wherein
the pattern switching part switches, for each image input as the input image and based on a type of an image region of the input image, between the watermark pattern output by the synchronization pattern generation part and the watermark pattern output by the watermark pattern generation part.

5. A digital watermark embedding method, comprising:
a watermark generation step of receiving an input of embedding information indicating information to be embedded in an input image to be processed, and generating a watermark pattern varying in a time direction based on the embedding information;
a synchronization pattern generation step of outputting, as a watermark pattern, a pre-set fixed pattern for detecting synchronization;
a pattern switching step of selecting, based on the input image, any one of the synchronization pattern generation step and the watermark pattern generation step; and
an embedding processing step of adding, to each pixel value of the input image, the watermark pattern output in the any one of the synchronization pattern generation step and the watermark pattern generation step selected in the pattern switching step, to thereby generate an embedded image having a digital watermark embedded therein.

6. A digital watermark embedding method according to claim 5, wherein
the pattern switching step comprises switching, based on a type of an image region of the input image, between the watermark pattern output in the synchronization pattern generation step and the watermark pattern output in the watermark pattern generation step.

7. A digital watermark embedding method according to claim 5, wherein
the pattern switching step comprises switching, for each image input as the input image, between the watermark pattern output in the synchronization pattern generation step and the watermark pattern output in the watermark pattern generation step.

8. A digital watermark embedding method according to claim 5, wherein
the pattern switching step comprises switching, for each image input as the input image and based on a type of an image region of the input image, between the watermark pattern output in the synchronization pattern generation step and the watermark pattern output in the watermark pattern generation step.

9. A digital watermark detection device, comprising:
a detected pattern generation part which receives an input of time information and generates a detected pattern varying in a time direction based on the time information;
a synchronization pattern correlation calculation part which obtains, for each of phases, a correlation between each pixel of an image to be subjected to detection and a fixed pattern for detecting synchronization, and outputs the correlation as a synchronization pattern correlation value;
a time synchronization detection part which outputs, of the phases, a phase in which a number of pixels each having the synchronization pattern correlation value larger than a pre-set predetermined correlation threshold value is maximum, as a time synchronized phase;
a correlation calculation part which calculates a correlation value between the pixel of the image to be subjected to detection and a pattern obtained by shifting the detected pattern by the time synchronized phase, and outputs the correlation value as a detected correlation value; and
a watermark judgment part which compares the detected correlation value with a pre-set threshold value, and determines, based on the result of comparison, a value of embedding information embedded in the image to be subjected to detection.

10. A digital watermark detection method, comprising:
a detected pattern generation step of receiving an input of time information and generating a detected pattern varying in a time direction based on the time information;
a synchronization pattern correlation calculation step of obtaining, for each of phases, a correlation between each pixel of an image to be subjected to detection and a fixed pattern for detecting synchronization, and outputting the correlation as a synchronization pattern correlation value;
a time synchronization detection step of outputting, of the phases, a phase in which a number of pixels each having the synchronization pattern correlation value larger than a pre-set predetermined correlation threshold value is maximum, as a time synchronized phase;
a correlation calculation step of calculating a correlation value between the pixel of the image to be subjected to detection and a pattern obtained by shifting the detected pattern by the time synchronized phase, and outputting the correlation value as a detected correlation value; and
a watermark judgment step of comparing the detected correlation value with a pre-set threshold value, and determining, based on the result of comparison, a value of embedding information embedded in the image to be subjected to detection.

\* \* \* \* \*